May 21, 1963  W. E. SARGEANT ETAL  3,090,548
ACCESSORY DRIVE MECHANISM
Filed May 15, 1961

INVENTORS
Walter E. Sargeant &
BY James E. Wilson
L. L. Spencer
ATTORNEY 3,090,548
ACCESSORY DRIVE MECHANISM
Walter E. Sargeant, Clawson, and James E. Wilson, St. Clair Shores, Mich., assignors to General Motors Corporation, Detroit, Mich., a corporation of Delaware
Filed May 15, 1961, Ser. No. 110,169
8 Claims. (Cl. 230—271)

This invention relates to fan drives and more particularly to an improved fan drive for driving the cooling fan of an internal combustion engine at variable speeds of rotation with respect to engine speed in accordance with cooling requirements of the engine.

It is well known that conventional fan drives wherein the engine fan is driven at speeds directly proportional to engine speed result in excess engine cooling, needlessly consume engine horsepower in excess of cooling requirements and provide an objectionally high noise level due to excess speed of rotation of the fan.

An object of this invention is to provide an engine fan drive wherein the fan speed is automatically varied with respect to engine speed to reduce the power consumption of the fan and fan noise over conventional fan drives.

Another object of this invention is to provide a variable speed fan drive in which the speed of rotation of the fan will diminish with respect to engine speed as the cooling requirements of the engine decrease.

A further object of this invention is to provide a magnetic engine fan drive incorporating a temperature responsive shunt formed of temperature sensitive material, the permeability of which varies with temperature automatically operable in response to rise in temperature to increase the fan speed with respect to engine speed.

An additional object of this invention is to provide a temperature responsive fan drive incorporating permanent magnet rings having a relatively high curie point, for example in the temperature range of 350°–1100° F. and having characteristics such that the saturation flux density changes little over a wide temperature range and incorporating a magnetic shunting ring having a relatively low curie point, for example 150° F. and having the characteristic that its flux density will change from maximum to a minimum of nearly zero in a narrow temperature range, for example 10° F.

Another object of this invention is to provide a temperature responsive magnetic fan drive of simple construction, capable of long useful life, and economical and simple to manufacture and assemble in large scale production.

A further object of this invention is to provide a magnetic fan drive of the type described capable of adaptation to vehicles already manufactured and in use.

An additional object of this invention is to provide a magnetic fan drive having a rotatable housing enclosing a rotatable magnet and containing finely divided magnetic material and incorporating cone-shaped deflectors cooperating to restrict passage of the magnetic material from the outer radial zone of the housing to the inner radial zone thereof and to permit the passage of the magnetic material from the inner radial zone to the outer radial zone into the vicinity of the magnet under centrifugal force imparted thereto.

These and other objects and advantages of this invention will be apparent from the following description and claims, taken in conjunction with the accompanying drawings, in which:

Figure 1:
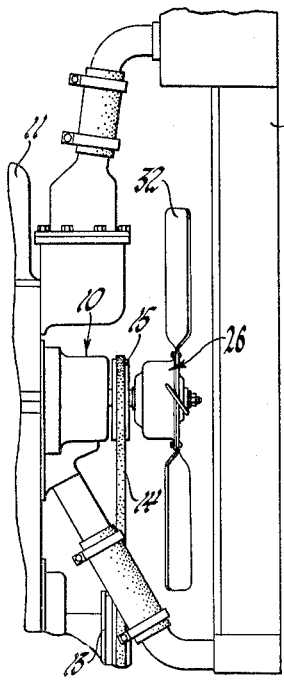
FIGURE 1 is a fragmentary side elevation view of an engine and cooling system provided with a cooling fan drive unit constructed in accordance with the principles of this invention.

Referring to FIGURE 1 there is shown a fan drive constructed in accordance with the principles of this invention in which the fan drive assembly 10 is positioned between an internal combustion engine 11 and an engine radiator 12 for driving cooling air through radiator 12. As shown, a pulley 15 driven from engine 11 by means of a pulley 13 and a belt 14 is fixed to a power input shaft 16 so that shaft 16 is continuously driven by engine 11. A pair of spaced ball bearings 17, 18 are fitted on shaft 16 with the inner race of each bearing fitted on a reduced diameter portion 19 of the shaft, the bearing 17 being in abutment with a shoulder 20 on shaft 16. A sleeve spacer 21 is fitted over the reduced diameter portion 19 and is keyed to the shaft for rotation therewith by means of a key 22. Sleeve 21 has a raised portion 23 intermediate its ends, the sleeve having its opposite ends in contact with the inner edges of the inner races of bearings 17 and 18 to maintain the bearings in proper spaced relationship. It will be apparent that bearing 17 is held between shoulder 20 and one end of sleeve 21. The inner race of bearing 18 is held between the opposite end of sleeve 21 and a washer 24 fixed to shaft 16 by means of a nut 25 threaded on the shaft. A fan blade support indicated generally at 26 is made up of two detachable sections 27 and 28. Section 27 includes a radially upstanding flange 29 adapted to be bolted to section 28 by bolts 30. Fan blades 32 are riveted or bolted to flange 29 and section 28, the two sections when assembled forming a closed chamber 31 within the fan blade support housing 26. Section 27 is fixed at its inner end to the outer race of bearing 17 and section 28 is fixed at its inner end to the outer race of bearing 18. Fan support housing 26 may, therefore, be freely rotatable with respect to shaft 16.

Within chamber 31 is a magnet support unit generally indicated at 32 formed of spaced upstanding arms 33 and 34. The inner end of arm 33 abuts a shoulder 35 at the termination of raised portion 23 of sleeve 21. The inner end of arm 34 abuts a shoulder 36 at the opposite end of raised portion 23 of sleeve 21. A series of spaced axially extending bolts or rivets 37 secure the two arms 33 and 34 to each other for rotation as a unit. A ferrite or permanent magnet indicated generally at 40 is composed of two magnet rings 41 and 42 each of a generally L-shaped configuration which in the assembly form a ring of U-shaped cross section. As shown, arm 33 is crimped over at its outer end to overlie the outer end of ring 41 and arm 34 is similarly crimped over at its outer end to overlie the outer end of ring 42 such that the outer end of the ring assembly is retained in spaced relationship radially inwardly from the axially extending cylindrical surface 43 of section 27 of housing 26. In this manner an air gap 44 is maintained between the outer end of the magnet and the cylindrical surface 43.

A magnetic shunting ring 45 extends between magnet rings 41 and 42, the shunting ring 45 extending axially between the ring sections to close off the space between the rings adjacent the outer ends of the U in the assembly. Air gap 44 formed between cylindrical surface 43, the outer cylindrical surface of shunt ring 45 and the outer periphery of arms 41 and 42 of the magnet rings is supplied with a quantity of finely divided magnetic material, such as, for example, iron filings indicated at 46.

In order to assure that the magnetic material will fill air gap 44 when the engine is running, a series of annular deflectors are provided. Each deflector includes a surface extending both axially and radially outwardly in the assembly. As shown, two deflectors 47 and 48 are fixed to the inner surface of the radially extending wall portions of housing section 27 and extend substantially across the space between the radially extending walls of section 27 into close proximity to radially extending arm 33. Deflector 47 is positioned adjacent the outer periphery of arm 33 and deflector 48 is disposed radially inwardly from deflector 47. A third deflector 49 fixed to arm 33 extends axially and radially outwardly in the opposite direction from deflector 48 such that deflector 48 overlies the outer end of deflector 49 with an open space between the outer end of deflector 49 and the inner cone surface of deflector 48.

In a similar manner a pair of deflectors 50 and 51 carried by member 28 present cone surfaces extending both axially and radially outwardly from member 28 into close proximity to arm 34. Cone surface 50 is positioned adjacent the outer periphery of magnet ring 34 and cone surface 51 is positioned radially inwardly on member 28. An additional deflector 52 carried by arm 34 presents a cone surface extending axially and radially outwardly from arm 34 in the opposite direction from cone 51 and radially inwardly from cone 51 such that cone 51 overlies cone 52 with an air space between the free end of cone 52 and the undersurface of cone 51.

In operation, cone deflectors 47 and 50 retain the majority of the iron filings in air gap 46 when the fan drive is stopped. Such filings as may fall radially inwardly are caught by the cones 48—49 and cones 51—52. Assuming the fan is being driven the iron filings will be thrown outwardly by centrifugal force and will pass through the air gap between cones 48—49 and 51—52, respectively. Such filings will also pass radially outwardly between the ends of cone 47 and arm 33 and cone 50 and arm 34, respectively, into air gap 46. It will be apparent that the conical deflectors are arranged to trap filings which tend to fall radially inwardly from the air gap when the shaft 16 is stopped and to permit the filings to pass radially outwardly to air gap 46 when shaft 16 rotates.

Figure 3:
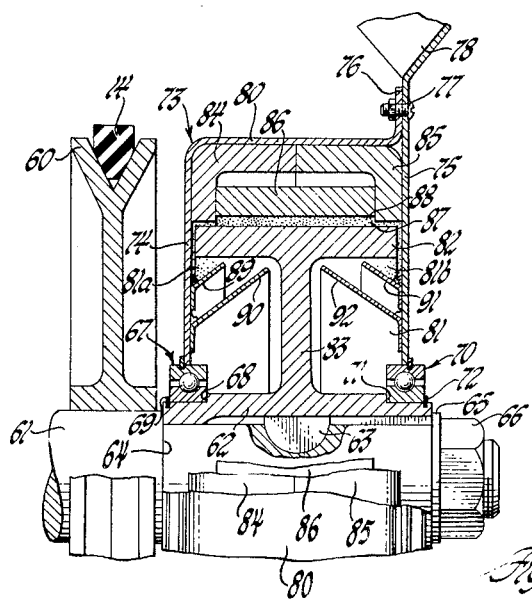
FIGURE 3 is a longitudinal and sectional view of a second embodiment of the invention.

Referring to FIGURE 3 there is shown an alternate embodiment of the invention wherein the magnet ring is carried by the driven portion of the fan drive rather than being positively rotated as in FIGURE 1. In this arrangement the air gap and iron filings are located between a positively driven member and the permanent magnet rather than between the magnet and driven fan support housing as in FIGURE 1.

In FIGURE 3 a pulley 60 corresponding to pulley 15 of FIGURE 1 drives a power input shaft 61. A sleeve 62 is keyed for rotation with shaft 61 by means of a key 63. Sleeve 62 abuts a shoulder 64 on shaft 61 and is retained on the shaft by means of a washer 65 and a nut 66 threaded on shaft 61. The inner race of a ball bearing 67 abuts a shoulder 68 on sleeve 62 and is retained on the sleeve by means of a snap ring 69. A second ball bearing 70 abuts a shoulder 71 on sleeve 62 and is retained in place on sleeve 62 by means of a snap ring 72.

A fan blade support housing indicated generally at 73 is made up of an assembly of detachable sections 74 and 75, the section 74 having a radially extending flange 76 adapted to be bolted to section 75 by bolts 77.

Fan blades 78 are fixed to the radially extending section 75 and flange 76 for rotation therewith. Section 74 is fixed to the outer race of bearing 67 and includes an axially extending cylindrical surface 80 on which flange 76 is formed. Section 75 is fixed to the outer race of bearing 70. The fan blade support housing 73 encloses a chamber 81 in which a cylindrical drum 82 is disposed, the drum being fixed to sleeve 62 by a web member 83. As shown, drum 82 extends axially across chamber 81 into close proximity with the radially extending wall of housing section 74 and housing section 75, respectively. A pair of L-shaped magnet rings 84 and 85 which in the assembly form a substantially U-shaped magnet ring are supported in the fan blade support housing chamber 81 such that the base of the U-shaped ring assembly seats on the inner surface of axially extending cylindrical surface 80 with the inwardly extending arms in contact with radially extending portions 74 and 75. A temperature responsive magnetic shunt ring 86 extends across the space at the open end of the U-shaped ring as shown. An air gap 87 between the inner ends of magnet rings 84, 85, shunt 86 and the cylindrical surface of drum 82 contains finely divided magnetic material such as iron filings 88. Web 83 divides chamber 81 into two spaced chambers 81a and 81b.

Disposed in chamber 81a, radially inwardly from drum 82, are a first pair of cone-shaped deflectors 89 and 90 carried by the radially extending wall of housing section 74, the cone deflectors extending both axially and radially outwardly towards web 83. In chamber 81b, at the opposite side of web 83 from deflectors 89 and 90, and carried by housing section 75, are a second pair of cone-shaped deflectors 91 and 92, the cone deflectors extending axially toward web 83 and radially outwardly. It will be apparent that deflectors 89 and 90 extend axially across the space between the end of drum 82 and the radial portion of housing 84 and that deflectors 91 and 92 extend across the space between the opposite end of drum 82 and the radially extending housing section 75. Cone deflector 90 is of greater length than deflector 89 so that the end of cone 90 is in closer proximity to web 83 than is the end of cone 89. In like manner cone 92 is of greater length than cone 91 so that the end of cone 92 is in closer proximity to web 83 than is the end of cone 91. Again, the cone deflectors are oriented in the assembly to trap iron filings which may tend to pass radially inwardly into chamber 81 and at the same time to permit such filings to pass radially outwardly into air gap 87 under centrifugal force.

Figure 2:
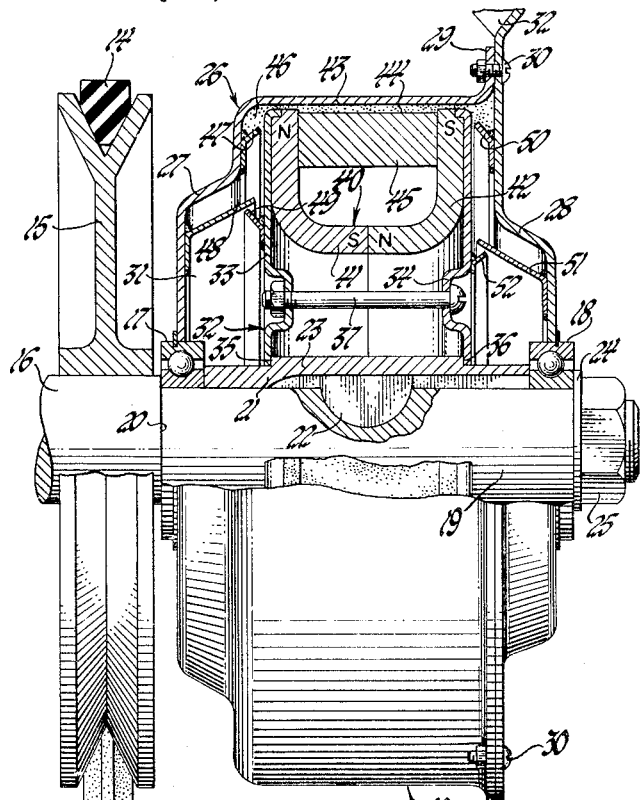
FIGURE 2 is a longitudinal and vertical sectional view of one structure incorporating the invention.

The permanent magnet rings shown in FIGURES 2 and 3 are made of materials having a relatively high curie point of the order of a range between 350° and 1100° F. and have characteristics such that the flux density changes as little as possible over a wide range of temperatures. In contrast to this, the magnetic shunting ring should have a relatively low curie point of the order of 160° F. and have the characteristic such that its flux density should go from a maximum to almost zero in a short temperature range of the order of 5° to 10° F. as the temperature of the shunt is raised to approach its curie point. The curie point may be defined as the temperature at which a ferromagnetic material becomes substantially non-magnetic.

In the operation of automatic vehicle engines it is common practice to use a thermostat to control the flow of hot coolant from the engine to the radiator in order to maintain the engine temperature at a sufficiently high temperature to provide efficient engine operations, for example 175° to 180° F. The temperature of coolant entering the radiator is rapidly decreased due to the radiator action and re-enters the engine at a cooler temperature, for example 150° F. The radiator and fan are designed to have sufficient capacity to maintain such a differential in coolant temperature.

When starting a vehicle which is cold it is advantageous to cut out the fan drive in order to accomplish a fast engine warm-up. Again, when operating on an open highway in cold or moderate temperatures, the ram effect of vehicle motion will often provide sufficient air flow through the radiator to assume proper cooling without operating the fan. This reduces horsepower consumption and fan noise. It is only when insufficient air passes through the radiator to provide adequate cooling that the fan need be operated.

Figure 4:
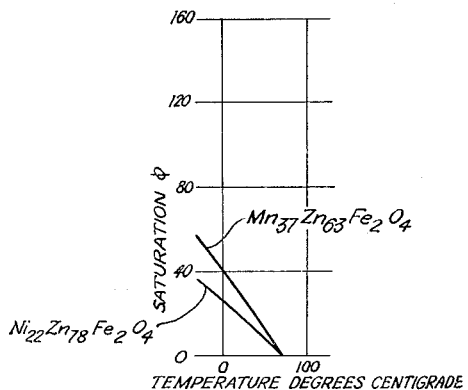
FIGURE 4 is a graph showing the saturation flux curve of two materials suitable for use as a magnetic shunt.

In FIGURE 4 there is shown a pair of graphs of two materials having curie points and curves of saturation flux which are practical for use as a shunt in the present application. These materials are $Mn_{.37}$, $Zn_{.63}$, $Fe_2$, $O_4$ and $Ni_{.22}$, $Zn_{.78}$, $Fe_2$, $O_4$, respectively. Both the manganese zinc ferrite and nickel zinc ferrite have a curie point of approximately 150° F. or 68° centigrade. The flux saturation curve for each material drops rapidly in the range between zero degrees centigrade (32° F.) and 68° C. as shown.

In operation, assuming a moderate winter temperature and assuming the car is cold from standing for some time with the engine turned off, the best flux path with this temperature condition from pole to pole of the magnet rings would be through the shunting ring and there is relatively little magnetic flux passing through the working gap. Under these conditions, little torque would be transmitted to the fan blades and the fan would substantially freewheel.

As the radiator warms up, heated air will warm the fan support housing and the shunting ring. When the shunting ring is heated above its curie point, it offers a poor path for the magnet flux and the action of the flux on the iron powder in the working gap will transmit torque to drive the fan blades. Thus, the fan will not be driven under air temperature conditions where the vehicle speed or outside air temperature conditions are sufficient to cool the engine. The shunting ring is formed of temperature responsive magnetic material having a high permeability below its curie point, cold; and very low permeability above its curie point when hot. The curie point of the material in the shunt is relatively low, of the order of 150° F., whereas that of the magnet rings is high, in the range of 350° to 1100° F. so that the flux density of the magnetic ring remains substantially constant over a wide temperature range. It will be understood that such a relationship of the curie points will provide for rapid cut-off of fan drive when the temperature of the shunt ring drops below its curie point and yet assures that the permanent magnet will remain effective at temperatures above the curie point of the shunt ring and below the curie point of the magnet ring to assure drive of the fan blades and proper cooling.

The arrangement provides a simple, inexpensive, temperature responsive accessory drive control automatically operable to drive the fan only when necessary to assure adequate engine cooling. The curie point of permanent magnet 40 is above temperatures normally encountered in the operation of the vehicle, so that magnet 40 is substantially unaffected by the heat to which it is subjected. The curie point of the shunt is, however, lower than normal engine operating temperatures and is in the range of desirable temperature at which the engine coolant is returned to the engine after passing through the radiator.

What is claimed is:

1. In a vehicle engine cooling system, a fan unit for cooling said engine, said fan unit comprising a power input member driven by said engine at speeds proportional to engine speed, a fan support housing rotatable at variable speeds of rotation with respect to said power input member, fan blades carried by said housing for rotation therewith, said housing enclosing a chamber, a rotatable member disposed in said chamber and driven by said power input member, a U-shaped permanent magnet ring disposed within said chamber for transmitting torque from said rotatable member to said housing in response to rotation of said rotatable member by said power input member, a magnet shunting ring carried by said permanent magnet ring and extending between the arms of said U-shaped permanent magnet ring, said shunting ring being formed of a temperature sensitive magnetic material characterized by its ability to vary its permeability with changes in temperature normally encountered in the normal operation of said engine, said shunting ring becoming increasingly magnetic with a drop in temperature and less magnetic with a rise in temperature, said permanent magnet ring being formed of magnetic material characterized by its ability to maintain a substantially constant flux density within the normal range of temperature encountered in operation of said engine.

2. In a vehicle engine cooling system, a fan unit for cooling said engine, said fan unit comprising a shaft driven by said engine at speeds proportional to engine speed, a fan support housing, said shaft extending through said housing, means supporting said housing for rotation at variable speeds of rotation with respect to said shaft, fan blades carried by said housing for rotation therewith, a chamber within said housing, a rotatable member disposed in said chamber and driven by said shaft, a U-shaped permanent magnet ring disposed in said chamber for transmitting torque from said rotatable member to said housing and having a pair of spaced upstanding arms, a magnet ring carried by said permanent magnet ring and extending across the space between said arms, said shunt ring being formed of a temperature sensitive material having a curie point falling within the normal range of temperatures encountered in normal operation of said engine, said permanent magnet ring being formed of a magnetic material having a curie point substantially higher than the highest temperature normally encountered in the operation of said engine.

3. In a vehicle engine cooling system, a fan unit for cooling said engine, said fan unit comprising a shaft driven by said engine at speeds proportional to engine speed, a fan support housing rotatably supported upon said shaft, fan blades carried by said housing, a chamber within said housing, a U-shaped permanent magnet disposed in said chamber and having a pair of upstanding arms spaced from each other, a magnet retainer driven by said shaft for rotating said magnet, a magnetic shunt ring carried by said permanent magnet and extending across the space between said arms, said shunt ring being disposed in close proximity to said housing to provide an air gap between said shunt ring and housing, finely divided particles of magnetic material disposed in said air gap, said permanent magnet ring being formed of magnetic material having a curie point substantially higher than the highest temperature encountered in the normal operation of said engine, said shunting ring being formed of magnetic material having a curie point within the range of temperature normally encountered in the operation of said engine.

4. In a vehicle engine cooling system, a fan unit for cooling said engine, said fan unit comprising a shaft driven by said engine, a fan support housing supported upon said shaft for rotation at variable speeds of rotation with respect to the speed of rotation of said shaft, fan blades mounted upon said housing for rotation therewith, said housing enclosing a chamber therein, a rotatable member disposed in said chamber and driven by said shaft, a permanent magnet ring disposed in said chamber for transmitting torque from said rotatable member to said housing and having a pair of spaced upstanding arms, a magnet shunt ring carried by said permanent magnet ring and extending across the space between said arms, said shunt ring being formed of a temperature sensitive material having a curie point falling within the normal range of operating temperature of said engine, said permanent magnet ring being formed of magnetic material having a curie point higher than the highest temperature encountered in the normal operation of said engine.

5. A temperature controlled fan drive for driving an engine cooling fan comprising a power input member driven by said engine and a fan support member rotatable at variable speeds of rotation with respect to the speed of rotation of said power input member, fan blades carried by said fan support member for rotation therewith, an additional member disposed within said fan support members and driven by said power input member, a permanent magnet ring fixed to one of said members for rotation therewith, said permanent magnet ring having axially spaced poles extending radially into close proximity with another of said members, a magnet shunting ring extending across the space between said poles, said shunting ring being formed of material having a relatively low currie point whereby said shunting ring provides a good flux path from pole to pole of said magnet ring when the temperature of said shunting ring is below the curie point of said shunting ring and a relatively poor flux path from pole to pole of said magnet ring when the temperature of said shunting ring is above the curie point of said shunting ring, said permanent magnet ring being formed of material having a relatively high curie point whereby the flux density of said magnet ring remains substantially constant throughout a wide range of temperatures above the curie point of said magnetic shunting ring, the curie point of said shunting ring falling within the range of temperature normally encountered in operation of said engine and the curie point of said permanent magnet ring being higher than the highest temperature of said temperature range.

6. A temperature controlled fan drive for driving an engine cooling fan comprising a power input shaft driven by said engine, a fan support member supported for rotation at variable speeds with respect to the speed of rotation of said shaft, said fan support member forming a closed chamber therein, fan blades carried by said support member for rotation therewith, an additional member disposed in said chamber and fixed to said power input shaft for rotation therewith, a permanent magnet ring disposed in said chamber and fixed to one of said rotatable member therewith, said permanent magnet ring having axially spaced poles extending radially into close proximity with the other of said rotatable members, a magnetic shunting ring carried by said permanent magnet ring for rotation therewith and extending axially across the space between said poles, said shunting ring being formed of magnetic material having a relatively low curie point whereby said shunting ring provides a relatively good flux path from pole to pole of said magnet ring when the temperature of said shunting ring is below its curie point and a poor flux path when the temperature of the shunting ring is above said curie point, said permanent magnet ring being formed of magnetic material having a relatively high curie point whereby the flux density of said permanent magnet ring remains substantially constant throughout a wide range of temperatures above the curie point of said magnetic shunting ring, the curie point of said shunting ring falling within the range of temperature normally encountered in operation of said engine and the curie point of said permanent magnet ring being higher than the highest temperature of said temperature range.

7. A temperature controlled fan drive for driving an engine cooling fan comprising a power input shaft driven by said engine, a fan support member, bearing means for supporting said fan support member on said shaft for rotation at varying speeds, fan blades carried by said support member, an additional member fixed to said shaft for rotation therewith, a permanent magnet ring fixed to one of said rotatable members for rotation therewith, said permanent magnet ring having axially spaced magnetic poles extending radially into close proximity with the other of said rotatable members, a working air gap between said magnetic poles and said other rotatable member, a magnetic shunt ring extending axially between said magnetic poles, powdered magnetic material in said working air gap between said magnetic poles, said shunt ring and said other rotatable member; said magnetic shunting ring being formed of magnetic material having a relatively low curie point whereby said shunting ring provides a relatively good flux path from pole to pole when the temperature of said shunting ring is below its curie point and a poor flux path when the temperature of said shunting ring is above its curie point, said permanent magnet ring being formed of magnetic material having a curie point higher than that of said shunting ring whereby the flux density of said permanent magnet ring remains substantially constant throughout a broad range of temperatures above the curie point of said shunting ring, the curie point of said shunting ring falling within the range of temperature normally encountered in operation of said engine and the curie point of said permanent magnet ring being higher than the highest temperature of said temperature range.

8. A magnetic fan drive for driving an engine cooling fan comprising a power input member driven by said engine and a fan support member rotatable at various speeds of rotation with respect to the speed of rotation of said power input member, a rotatable member driven by said power input member and disposed within said fan support member, means forming a U-shaped permanent magnet ring disposed within said fan support member, a magnet shunting ring extending across the open end of said U-shaped member, said shunting ring being formed of a temperature sensitive magnetic material characterized by its ability to vary its permeability with temperature, said shunting ring becoming more magnetic when cold and less magnetic when hot and having a relatively low curie point, said permanent magnet ring having a relatively high curie point whereby said magnet remains effective at temperatures above the curie point of said shunting ring and whereby the flux density of said permanent magnet varies only a small amount over a wide temperature range, said shunting ring having a curie point falling within the normal range of operating temperature of said engine and said permanent magnet ring being higher than the highest temperature of said range of temperatures.

References Cited in the file of this patent

UNITED STATES PATENTS

| | | |
|---|---|---|
| 1,608,872 | Wallis | Nov. 30, 1926 |
| 1,934,783 | Arterburn | Nov. 14, 1933 |
| 2,396,000 | Findley | Mar. 5, 1946 |
| 2,720,603 | Mitchel et al. | Oct. 11, 1955 |
| 2,720,604 | Mitchel et al. | Oct. 11, 1955 |
| 2,725,493 | Mitchel et al. | Nov. 29, 1955 |
| 2,736,409 | Logan | Feb. 28, 1956 |
| 2,847,101 | Bergmann | Aug. 12, 1958 |

FOREIGN PATENTS

| | | |
|---|---|---|
| 729,071 | Great Britain | May 4, 1955 |